(12) United States Patent
Chang

(10) Patent No.: US 9,186,991 B2
(45) Date of Patent: *Nov. 17, 2015

(54) THERMAL GRILL FOR BODY COOLING AND DRIVER ALERTNESS

(71) Applicant: Honda Motor Co., Ltd., Tokyo (JP)

(72) Inventor: Hsuan Chang, Los Altos, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/451,436

(22) Filed: Aug. 5, 2014

(65) Prior Publication Data

US 2014/0343798 A1    Nov. 20, 2014

Related U.S. Application Data

(63) Continuation of application No. 13/894,003, filed on May 14, 2013, now Pat. No. 8,831,836.

(60) Provisional application No. 61/646,566, filed on May 14, 2012.

(51) Int. Cl.
*G06F 17/00* (2006.01)
*B60K 28/06* (2006.01)
(Continued)

(52) U.S. Cl.
CPC ............... *B60K 28/06* (2013.01); *B60K 35/00* (2013.01); *G06F 17/00* (2013.01); *G08B 21/06* (2013.01);
(Continued)

(58) Field of Classification Search
CPC ............ B60C 23/0408; B60K 2350/1024; B60K 2350/1028; B60K 28/066; B60K 35/00
USPC ................. 701/45; 340/435, 436, 438, 425.5
See application file for complete search history.

(56) References Cited

U.S. PATENT DOCUMENTS 5,689,241 A    11/1997  Clarke, Sr. et al.
6,166,627 A    12/2000  Reeley
(Continued)

FOREIGN PATENT DOCUMENTS

WO    WO 2006/115562 A1    11/2006
WO    WO 2008/020347 A1    2/2008
(Continued)

OTHER PUBLICATIONS

Hirata, K., et al., "Partitional measurement of capillary and arteriovenous anastomotic blood flow in the human finger by laser-Doppler-flowmeter," European Journal of Applied Physiology and Occupational Physiology, 1988, pp. 616-621, vol. 57.
(Continued)

*Primary Examiner* — McDieunel Marc
(74) *Attorney, Agent, or Firm* — Fenwick & West LLP

(57) ABSTRACT

A system for keeping a driver alert by employing a thermal grill that includes warm and cool regions. The system includes an alert module that configures the thermal grill to a heat sink configuration and a heat source configuration. The thermal grill in the heat sink configuration extracts heat from the driver's body, lowers the driver's temperature, and keeps the driver alert. The thermal grill in the heat source configuration raises the driver's temperature and avoids vasoconstriction. The alert module also monitors at least one of the driver's biomarkers like blood flow in the driver's fingers. The alert module monitors the driver's biomarkers to determine when to reconfigure the thermal grill to a configuration other than the heat sink configuration. If the monitored biomarkers indicate that the driver is in a vasoconstricted state, the alert module can reconfigure the thermal grill.

21 Claims, 6 Drawing Sheets

(51) Int. Cl.
    *G08B 21/06*     (2006.01)
    *B60K 35/00*     (2006.01)
    *B60C 23/04*     (2006.01)
    *B60K 37/06*     (2006.01)
    *B60W 40/08*     (2012.01)

(52) U.S. Cl.
    CPC ........... *B60C 23/0408* (2013.01); *B60K 28/066* (2013.01); *B60K 37/06* (2013.01); *B60K 2350/1024* (2013.01); *B60K 2350/1028* (2013.01); *B60W 2040/0827* (2013.01)

(56) References Cited

U.S. PATENT DOCUMENTS

| | | | |
|---|---|---|---|
| 6,313,749 | B1 | 11/2001 | Horne et al. |
| 6,509,552 | B1 | 1/2003 | Roske et al. |
| 7,153,092 | B1 | 12/2006 | Randolph |
| 7,321,309 | B2 | 1/2008 | Cohen |
| 7,875,066 | B2 | 1/2011 | Cohen et al. |
| 7,924,142 | B2 | 4/2011 | Cohen et al. |
| 8,044,776 | B2 | 10/2011 | Schofield et al. |
| 8,831,836 | B2 * | 9/2014 | Chang ............................ 701/45 |
| 2002/0101354 | A1 | 8/2002 | Banas |
| 2003/0096593 | A1 | 5/2003 | Naboulsi |
| 2008/0045913 | A1 | 2/2008 | Johnson et al. |
| 2008/0180235 | A1 | 7/2008 | Chang |
| 2010/0076273 | A1 | 3/2010 | Shigetou |
| 2010/0214087 | A1 | 8/2010 | Nakagoshi et al. |
| 2011/0109462 | A1 | 5/2011 | Deng et al. |
| 2013/0069788 | A1 | 3/2013 | Chang |
| 2013/0304328 | A1 * | 11/2013 | Chang ............................ 701/45 |
| 2014/0343798 | A1 * | 11/2014 | Chang ............................ 701/45 |

FOREIGN PATENT DOCUMENTS

| | | |
|---|---|---|
| WO | WO 2008/072107 A1 | 6/2008 |
| WO | WO 2009/007952 A2 | 1/2009 |

OTHER PUBLICATIONS

Nilsson, G., et al., "Evaluation of a Laser Doppler Flowmeter for Measurement of Tissue Blood Flow," IEEE Transactions on Biomedical Engineering, Oct. 1980, pp. 597-604, vol. BME-27, No. 10.

United States Office Action, U.S. Appl. No. 13/894,003, Nov. 4, 2013, nine pages.

* cited by examiner

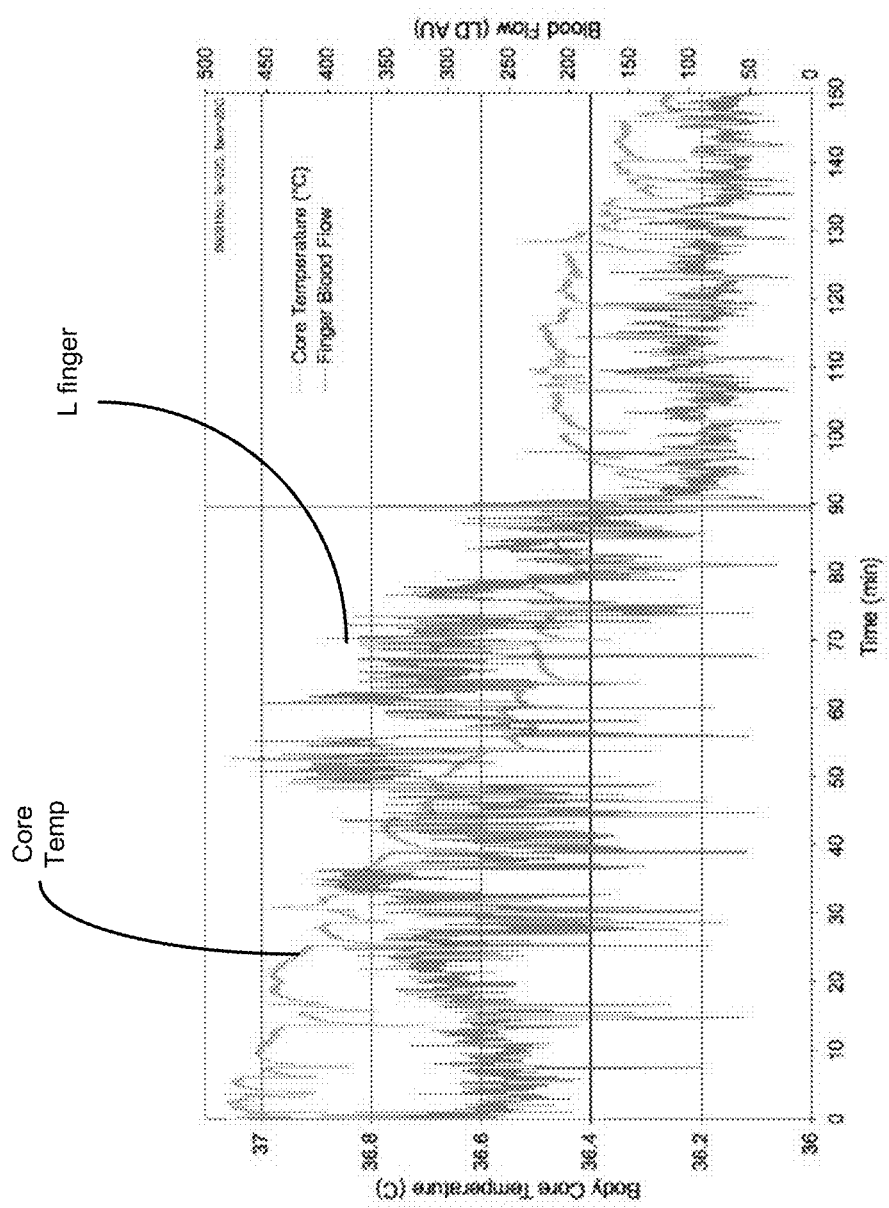

THERMAL GRILL FOR BODY COOLING AND DRIVER ALERTNESS

CROSS-REFERENCE TO RELATED APPLICATIONS

This application is a continuation of U.S. patent application Ser. No. 13/894,003, filed May 14, 2013, which claims priority to U.S. Provisional Application No. 61/646,566, filed on May 14, 2012, all of which are incorporated by reference herein in their entirety.

BACKGROUND

1. Field of Disclosure

The disclosure generally relates to driver and vehicle safety, in particular to keeping a driver alert.

2. Description of the Related Art

Vehicle manufacturers today are developing various safety features for detecting sleep onset and then alerting the driver. For example, conventional systems blow air on the driver's face or play an alert sound to alert a drowsy driver. However, such sleep detection systems are not completely accurate and sometimes lead to false positives that annoy the driver.

SUMMARY

Embodiments keep a driver alert by employing a thermal grill that includes warm and cool regions. The thermal grill is located, for example, on the steering wheel such that it is in contact with the driver's palms when the driver is holding the steering wheel. The disclosed system includes an alert module that configures the thermal grill to a heat sink configuration. For the heat sink configuration, the alert module configures the grill's warm regions to a temperature of, in one embodiment, approximately thirty degrees Celsius and the cool regions to a temperature of, in one embodiment, approximately twenty four degrees Celsius. The alert module may configure the warm and cool regions to other temperatures to vary the capacity of the heat sink. The thermal grill in the heat sink configuration extracts heat from the driver's body, lowers the driver's temperature, and keeps the driver alert. The alert module also monitors at least one of a driver's biomarkers such as blood flow in the driver's fingers and/or temperature of the palm, for example. The alert module monitors the driver's biomarkers to determine when to reconfigure the thermal grill. For example, if the monitored biomarkers indicate that the driver starts to vasoconstrict, the alert module reconfigures the thermal grill to a configuration other than the heat sink configuration.

Other embodiments include computer-readable medium that store instructions for implementing the above described functions of the system, and computer-implemented method that includes steps for performing the above described functions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

FIG. 6 is an illustration representing the temperature changes and corresponding blood flow fluctuation in a finger of a driver over a period of time in accordance with one embodiment.

DETAILED DESCRIPTION

The computing environment described herein keeps a driver alert without necessarily monitoring the driver's drowsiness. The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Overview

The core temperature in a human body maintains a rhythmic variation, called circadian rhythm, throughout the day. This circadian rhythm of core temperature governs various bodily functions such as the sleep cycle and hormone regulation. Altering the core body temperature is not easily accomplished since the body counters such attempts through its internal mechanisms. For example, the human body regulates its temperature by controlling the amount of heat it loses to the environment through arteriovenous anastomoses (AVAs) primarily located in the palms and soles of a person but also located throughout the body, e.g., in fingers. The body may therefore control the heat loss being triggered by external factors by controlling the AVAs. To lose heat, the body vasodilates, i.e., the body constricts the AVAs. When the body wants to constrict heat loss, the body vasoconstricts, i.e., the body opens the blood flow in the AVAs, and the opened AVAs hinder the heat loss.

Figure 4A:
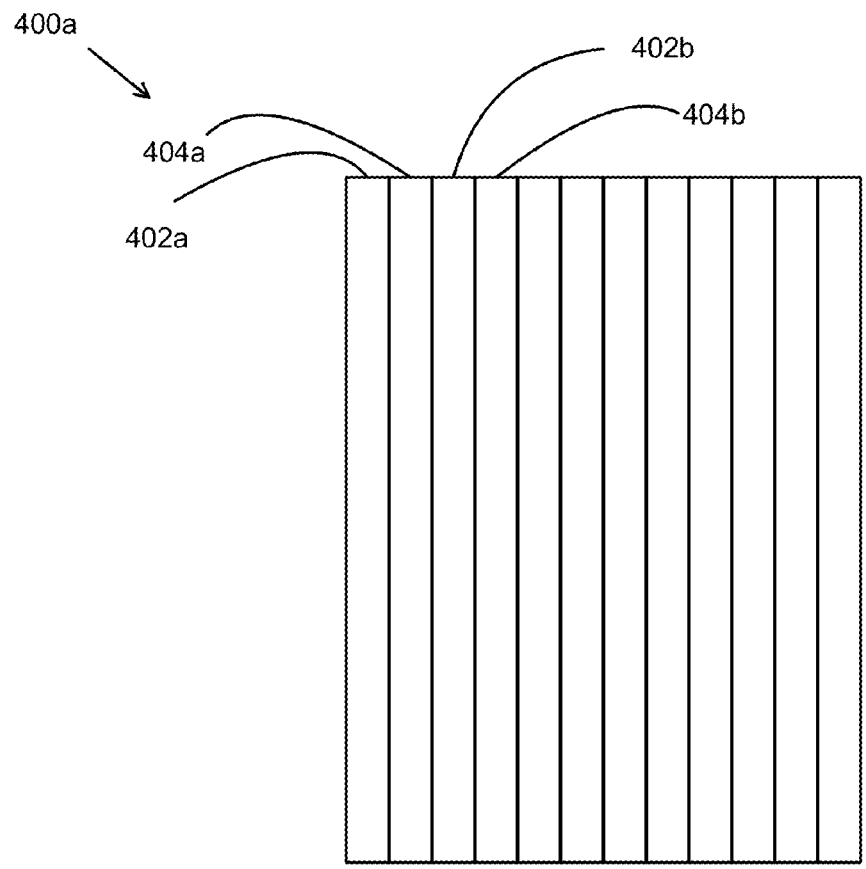
FIG. 4A is a block diagram illustrating a thermal grill for keeping a driver alert according to one embodiment.

The disclosed methods and systems employ a Thunberg Thermal Grill (hereinafter referred to as "TTG") to lower a driver's body temperature while reducing or hindering vasoconstriction in the driver's body. The TTG, also known as thermal grill, is further described in U.S. Pat. No. 7,321,309, which is incorporated by reference herein in its entirety. FIG. 4A illustrates an example of TTG in vehicle 101. As illustrated in FIG. 4A, the TTG 400a comprises alternating warm regions 402a-b and cold regions 404a-b. The cold regions in the TTG draw heat from the driver's body while the sensations produced by the interlaced cold and warm regions mask, hinder or avoid the detection of heat loss by the driver's brain and therefore hinder or avoid vasoconstriction. The TTG 400 therefore efficiently draws heat from the driver's body without or with relatively reduced counteracting vasoconstriction. The reduced heat lowers the driver's body temperature and keeps the driver alert. A proxy for when the driver loses too much heat, in one embodiment, is the driver entering a vasoconstricted state.

Figure 4B:
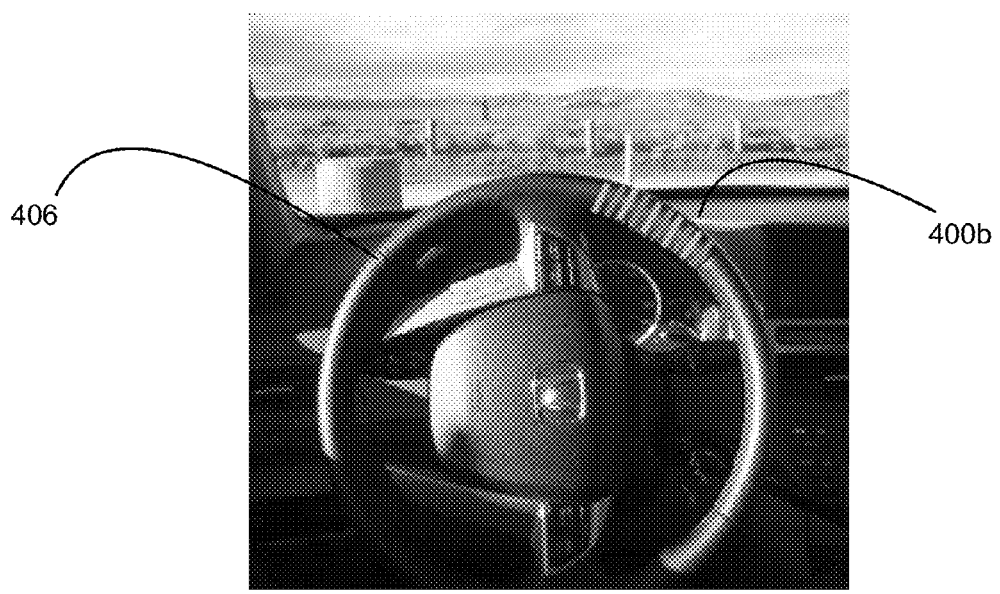
FIG. 4B is a block diagram illustrating a thermal grill mounted on a steering wheel for keeping a driver alert according to one embodiment.

The TTG 400a may be mounted in various locations in the vehicle 101 such that the TTG 400a is in contact with the driver. FIG. 4B illustrates one such location wherein, according to one embodiment, the TTG 400b is located on the steering wheel 406 of the vehicle according to one embodiment. Placing the TTG 400 on the steering wheel 406 beneficially places the TTG 400 in substantially continuous contact with the driver's palm(s) and/or fingers and allows the TTG 400 to lower the driver's body temperature.

System Environment

Figure 1:
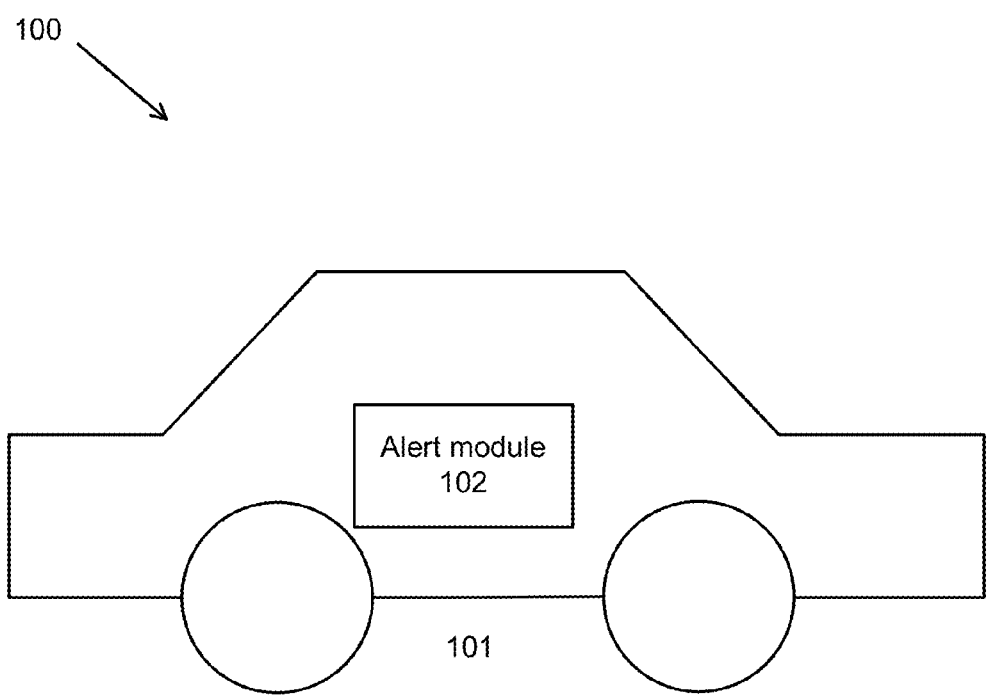
FIG. 1 is a block diagram illustrating a computing environment for keeping a driver alert without monitoring the driver's drowsiness according to one embodiment.

Referring to FIG. 1, the computing environment 100 for keeping a driver alert comprises an alert module 102. In one embodiment, the alert module 102 is located in the vehicle 101 driven by the driver. In another embodiment, the alert module 102 is located in a remote location and the alert module 102 wirelessly communicates with various components in the vehicle 101. Regardless of the location of the alert module 102, the alert module 102 configures a TTG 400 in the vehicle 101 to a heat sink configuration to draw heat from the driver's body, reduce the driver's body temperature and keep the driver alert. In one embodiment, the alert module 102 monitors the driver's biological markers (or biomarkers) like driver's skin temperature or peripheral blood flow to determine whether the driver is vasoconstricted. If the driver is vasoconstricted, the alert module 102 turns off the heat sink configuration for the TTG 400. The alert module 102 keeps monitoring the driver and, in one embodiment, once the module 102 determines that the driver is no longer vasoconstricted, and a minimum time period has elapsed, e.g., 30 minutes, the alert module 102 turns on the heat sink configuration to draw heat from the driver's body again.

In one embodiment, the alert module 102 turns on the heat sink configuration after a determined amount of time has elapsed since determining that the driver is no longer vasoconstricted. This additional time buffer beneficially avoids a hysteresis loop wherein the driver is repeatedly vasoconstricted because the TTG 400 is configured to a heat sink configuration too soon after the driver is not vasoconstricted. In one embodiment, the alert module 102 ensures that the amount of heat drawn from the driver's body is within a safe range by turning off the heat sink configuration after a determined time period of turning on the heat sink configuration regardless of whether the driver is vasoconstricted. Other factors may also be considered such as factors related to the driver's behavior such as a driver shivering.

In another embodiment, the alert module 102 alternatively configures the TTG 400 to heat sink and heat source configurations to extract and then provide heat to the driver's body. Additionally, the alert module 102 monitors the driver's skin temperature (that serves as a proxy for the driver's core temperature) to ensure that the driver's temperature remains between a desired range of temperature called the thermo-neutral zone. To monitor the driver's skin temperature, the alert module 102 is communicatively coupled to a thermocouple (not shown) in contact with the driver's body. In one embodiment, the thermocouple is placed on the steering wheel such that the thermocouple is in contact with the driver's palm when the driver holds the steering wheel.

Figure 5:
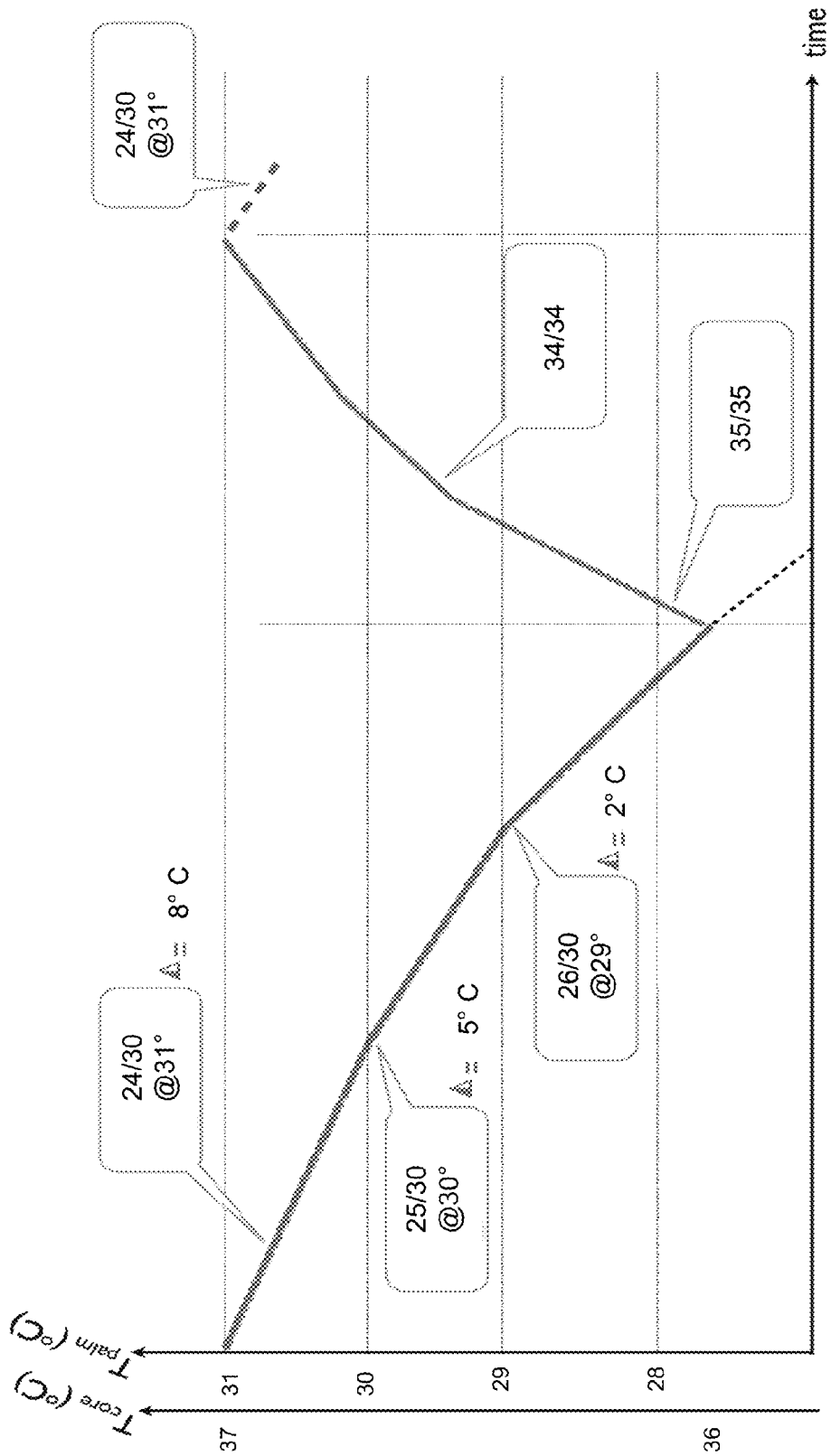
FIG. 5 illustrates the change in driver's temperature as the alert module alternates the thermal grill between heat sink and heat source configurations according to one embodiment.

FIG. 5 illustrates the change in driver's temperature as the alert module 102 alternates the TTG 400 between heat sink and heat source configurations. In FIG. 5, the driver's thermo-neutral zone is at a core temperature between approximately thirty six and thirty seven degrees Celsius, or at a skin temperature measured on the driver's palm that correlates to this core temperature range. In an embodiment this palm temperature can be between twenty-eight and thirty one degrees Celsius, for example. In other embodiments, the driver's thermo-neutral zone is a different range and the alert module 102 configures the TTG 400 to maintain the driver's temperature between that range.

Referring to the illustrated temperature range in FIG. 5 which represents one embodiment, the alert module 102 receives input data from the thermocouple indicating that the driver's skin temperature is approximately thirty-one degrees Celsius (the upper limit of thermo-neutral zone in this example) and the alert module 102 configures the TTG 400 to the heat sink configuration. In an example heat sink configuration, the alert module 102 may configure the warm bars in the TTG 400 to thirty degrees and cool bars to twenty four degrees while the driver's skin temperature is at approximately thirty-one degrees. Such a configuration has a net delta of negative eight degrees between driver's skin temperature and the temperature of TTG 400 (($T_{cold\ bars} - T_{skin}$)+ ($T_{warm\ bars} - T_{skin}$) (24−31)+(30−31)=−8). The net delta value represents an amount of heat that the TTG 400 can extract from the driver's body. In one embodiment, as the data from thermocouple indicates that the driver's skin temperature is decreasing, the alert module 102 changes the temperatures of the warm bars and cool bars to adjust the TTG 400 to other heat sink configurations and extract heat as desired. For example, when the driver's skin temperature falls from thirty degrees to twenty-nine degrees, the alert module 102 changes the temperature of the cool bars to twenty six degrees and warm bars to thirty degrees. As described herein, in alternate embodiments, different temperature ranges for the core temperature, palm temperature and grill temperatures can be used.

Because of the heat sink configuration, the driver starts losing heat and the driver's skin temperature (and core temperature) starts decreasing. While the TTG 400 is in the heat sink configuration, the alert module 102 monitors the driver's skin temperature to determine when to reconfigure the TTG 400 from heat sink configuration to another configuration (e.g., a heat source configuration an ambient configuration, or a TTG 400 off configuration). The alert module 102 monitors the driver's skin temperature through data received from the thermocouple.

In this example, as the driver's skin temperature approaches twenty-eight degrees Celsius (or the lower end of the thermo-neutral zone), the alert module 102 configures the TTG 400 to a heat source. The alert module 102 may configure the TTG 400 to a heat source once the driver's skin temperature reaches approximately 27.8 degrees Celsius or another temperature proximate to a temperature near the lower end of the driver's thermo-neutral zone, e.g., twenty-eight degrees Celsius. In an example heat source configuration, the alert module 102 may configure both the warm and cool bars in the TTG 400 to thirty-five degrees while the driver's skin temperature is at or below approximately twenty-eight degrees. The alert module 102 may vary the temperature of the warm and cool bars to configure the TTG 400 to different heat source configurations as the driver's temperature increases while the TTG 400 is in the heat source configuration.

In one embodiment, the alert module 102 maintains the TTG 400 in the heat source configuration for a determined amount of time (e.g., thirty minutes). After the determined amount of time has elapsed, the alert module 102 configures the TTG 400 to another configuration (like heat sink configuration). In this manner, the alert module 102, in one embodiment, alternates the TTG 400 to heat sink and heat source configuration to keep the driver alert. These different configurations increase and decrease the driver's core temperature while maintaining the temperature within thermo-neutral zone. This temperature variation helps keep the driver alert.

In another embodiment, the palm temperature, a finger temperature or the temperature of another location of the driver that provides a proxy for the core temperature of the driver is taken over time and multiple temperature values are used to help determine when the driver is in a vasoconstriction state or a vasodilation state. FIG. 5 may represent a theoretical palm temperature reading with the temperature showing a consistent trend. FIG. 6 is an illustration representing actual temperature changes of a driver over a period of time in accordance with one embodiment. FIG. 6 represents the temperature changes and finger blood flow in an environment similar to a driving environment, e.g., subject (driver) is stationary. In FIG. 6 the heat sink/source of the driver is controlled using a system different from the TTG system and represents the temperature changes of the driver. As seen in FIG. 6, the palm temperature or finger blood flow (L) is an imperfect representation of the body's core temperature. In addition, as seen in the example shown in FIG. 6, the core body temperature variation is not linear. The variation of the core body temperature proxies, e.g., palm temperature, blood flow in finger, can fluctuate based on a variety of circumstances, such as the movement or removal of the driver's palm on the steering wheel, changes in the cabin temperature, air flow in the cabin and changes in temperature of body parts that are exposed to sunlight, in certain conditions. In FIG. 6 a finger blood flow is determined using a conventional laser Doppler unit for example, as described herein. In FIG. 6 the values of the laser Doppler reading range from about zero to five hundred and is shown as the right axis. As shown, the blood flow readings vary but the majority of readings are consistently between 200 and 400 during the first 90 minutes. For the next 60 minutes the blood flow readings drop below 150. This drop represents the body going into a vasoconstriction state and is correlated to a core body temperature of approximately 36.3 C in FIG. 6. The specific values shown in FIG. 6 represent one example, the values can vary for different drivers/people and the same driver/person at a different time. Examples of techniques for determining when a vasoconstriction threshold has been reached/passed include comparing the proxy values for a driver over a period, e.g., a period of the driving event. For example, in FIG. 6, the LDAU values (raw or averaged or filtered, for example) for the driver during the in time period 0 to 90 minutes is generally in the 200-400 range and then decrease at approximately 90 minutes when the LDAU values through minute 150 are in the 50-150 range. A ratio of LDAU values, e.g., the ratio of approximately 3:1 (LDAU 300:100) in the example of FIG. 6, can be used to determine when the driver enters a vasoconstriction state. In alternate embodiments, driver characteristics, e.g., weight, age etc, can also be factors in determining a vasoconstriction threshold.

In an embodiment, multiple readings of values over time are used by the alert module 102 to determine when the TTG 400 should transition away from a heat-sink state. In an embodiment, the value of the proxy, e.g., palm temperature, finger temperature, blood flow, etc., are compared over time. A benefit of using the proxy values over time is that it can filter noise and variations due to natural driver conditions, e.g., movement of hands, cabin temperature, cabin air flow, for example, air flow on to the finger/palm while the driver's fingers/palms are in certain positions, etc.

In an embodiment a conventional data trending analysis algorithm, e.g., an average value over time, median over time, etc, can be applied to the raw proxy values in order to filter the natural variations of the proxy values. For ease of discussion, this example will reference a filtered proxy value although in alternate embodiments non-filtered proxy values can also be used. In embodiments, the filtered proxy values are compared over time in order to determine when the filtered proxy values reach a value that triggers the transition away from the heat-sink state. In the example shown in FIG. 6, the proxy value represents the blood flow in a finger and a filtered proxy value (not shown) may be consistent with the majority of readings during the time period as described above. For example, the filtered proxy values over time drop from values in the 200 range just prior to (approximately) minute 90 to values in the 80 range just after (approximately) minute 90. In an embodiment the alert module 102 identifies this drop and correlates this to the driver entering a vasoconstricted state. As a result of the driver entering the vaso-constricted state the alert module 104 configures the TTG 400 to a heat source configuration (in one embodiment) by configuring both the warm and cool bars in the TTG 400 to a warm temperature, e.g., thirty-five degrees in one example, in order to warm the driver and assist in having the driver enter a vasodilated state.

As described above, the TTG 400 can be configured to be in a heat source mode for a period of time and/or can monitor the driver and transition the TTG 400 to an ambient configuration or a heat sink configuration based on the proxy values that can be continually monitored.

In another embodiment, the proxy value may be a temperature reading, e.g., temperature of the palm of the driver. In an embodiment, proxy values over time are compared in order to determine when a trigger occurs that represents the driver entering a vasoconstricted state. For example, the temperature of one or both of the driver's palms may be received and the alert module 102 can filter the raw proxy data, as described above. The filtered proxy data may be similar to the data in FIG. 5. If the filtered proxy data decreases over a period of time at a threshold rate and/or the filtered proxy value is at a threshold value then the alert module 102 can determine that the driver is in a vasoconstricted state and can configure the TTG 400 to exit the heat sink configuration. The threshold rate may vary based on the TTG 400 configuration delta value, for example.

In one embodiment, the alert module 104 receives signals representing biomarker information, e.g., the skin temperature, and when the temperature remains substantially flat for a period of time the alert module 102 interprets this as the driver having entered a vasoconstricted state. The alert module 102 can then configure the TTG 400 to a heat source configuration.

Figure 2:
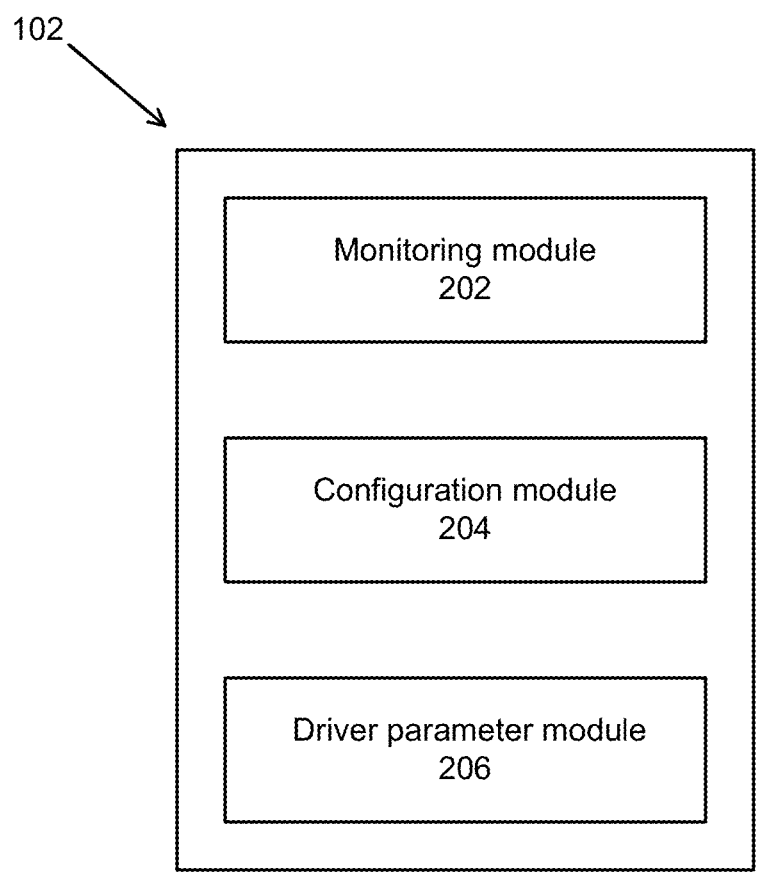
FIG. 2 is a block diagram illustrating an alert module according to one embodiment.

FIG. 2 is a block diagram illustrating the alert module 102 according to one embodiment. The alert module 102 comprises a monitoring module 202, a configuration module 204 and a driver parameter module 206.

The monitoring module 202 receives and stores values for the driver's biological markers such as the driver's core temperature, skin temperature and/or blood flow, for example. Another example is to measure the blood flow, temperature using a thermal camera, e.g., capturing thermal images of the face or other glabrous skin areas of the driver. In an embodiment, the thermal images and/or the represented blood flow and/or skin temperature can be compared over time to ascertain if a driver has entered a core-temperature triggered vasoconstriction state. These stored values help the alert module 102 determine if the driver is vasoconstricted. The monitoring module 202 is communicatively coupled to the appropriate sensors for receiving the biological marker values. For example, the monitoring module 202 is communicatively coupled with one or more laser Doppler units including a laser head and a photodetector (like a photodiode). The laser Doppler units are located on the steering wheel (not shown) of the vehicle 100 such that the driver's fingers are in contact with at least one laser Doppler unit as the driver is holding the steering wheel and driving the vehicle. The laser Doppler units can be positioned elsewhere, e.g., as part of an earpiece that is communicatively coupled to the alert module 104 using a wireless (e.g., Bluetooth, WiFi), or wired configuration, for example. The mechanism for determining blood flow measured in laser Doppler arbitrary units (LDAU) is further described in Evaluation of a Laser Doppler Flowmeter for Measurement of Tissue Blood Flow, IEEE Trans. Biomed. Eng., 27 (1980), pp. 597-604, which is incorporated herein by reference in its entirety. The monitoring module 202 repeatedly monitors the driver's biological markers like blood flow and stores the values for the measured markers.

The configuration module 204 repeatedly configures the TTG 400 to various configurations to draw heat from the driver and reduce (or prevent) vasoconstriction in the driver's body. In one embodiment, the configuration module 204 configures the TTG 400 to the heat sink configuration after the driver turns on the vehicle. In another embodiment, the configuration module 204 receives an input from the driver indicating his desire to turn on the alert module 102. The configuration module 204, in this embodiment, configures the TTG 400 to the heat sink configuration upon receiving the input.

In another embodiment, as described above, the configuration module 204 configures the TTG 400 to the heat sink configuration after the driver has been driving the vehicle 101 for a period of time. For example, if a driver initially chooses against activating the alert module 102, the configuration module 204 determines if the driver has been driving the vehicle for an amount of time. If so, the configuration module 204 configures the TTG 400 to the heat sink configuration. In one embodiment, the configuration module 204 provides a visual or audio warning before configuring the TTG 400. In yet another embodiment, after receiving the warning, the driver may select an input indicating to the configuration module 204 whether or not to configure the TTG 400. In this embodiment, the configuration module 204 configures the TTG 400 to heat sink configuration unless the driver has indicated otherwise.

Alternatively, the configuration module 204 determines whether a driver is vasoconstricted based on the stored biological marker values and configures the TTG 400 accordingly. In one embodiment, the configuration module 204 determines that a driver is vasoconstricted if the stored marker value is above or below a threshold. The threshold may be based on analysis of biological marker values for the general population, population in the driver's demographic or the driver. In one embodiment, the biological marker data for this analysis is accumulated by the driver parameter module 206. In other embodiments, the data maybe accumulated through controlled studies.

Regardless of the data's source, the data provides the threshold for determining vasoconstriction. For example, the data may indicate that the blood flow in fingers of the general population varies between 100-400 LDAU. Accordingly, the configuration module 204 may be configured with (or determine) a vasoconstriction threshold value that is closer to the lower limit of general population blood flow. For example, the configuration module 204 may determine the vasoconstriction threshold to be the sum of the lower limit (100 LDAU) and a percentage (e.g. 25%) of the difference between the lower and upper limit. In this example, the configuration module 204 determines that the driver is vasoconstricted if the driver's measured blood flow is below the vasoconstriction threshold of 175 LDAU (100+25%*(400−100)). Otherwise, the configuration module 204 determines that the driver is not vasoconstricted.

In another example, the configuration module 206 may determine a vasoconstriction threshold specific to the driver instead of the general population. The configuration module 206 may receive data from the driver parameter module 206 indicating that the driver's blood flow varies between 125-375 LDAU, and the configuration module 204 may determine a vasoconstriction threshold closer to the lower limit of 125 LDAU. For example, the configuration module 204 determines 200 LDAU (125+30%*(375−125)) as the vasoconstriction threshold for the driver.

As described above, the alert module 104 may compare proxy values over time to determine when vasoconstriction occurs. In another embodiment, a sudden change in the driver's blood flow (raw or filtered values) may be interpreted as the driver entering a vasoconstricted state. An example of this is shown in FIG. 6 at approximately minute 90.

The configuration module 204 may repeatedly determine whether the driver is vasoconstricted and configures the TTG 400 accordingly. If the configuration module 204 determines that the driver is not vasoconstricted, the configuration module 204 configures the TTG 400 to a heat sink configuration. To achieve the heat sink configuration, in one embodiment, the configuration module 204 configures the warm regions to a first temperature (e.g. a temperature between 30-36 degrees Celsius) and the cold regions to a second temperature (e.g. between 20-26 degrees Celsius). In other embodiments, the cold regions' temperature is an amount lower than the ambient temperature and the warm regions' temperature is an amount higher than the ambient temperature. In yet another embodiment, to achieve the heat sink configuration, the configuration module 204 configures the TTG 400 such that the temperature difference between the cold regions' temperature and the driver's skin temperature (or skin temperature of an average driver in general population or the ambient temperature) is larger than the temperature difference between the warm regions' temperature and the driver's skin temperature (or skin temperature of an average driver in general population or the ambient temperature). These configurations beneficially enable the cold regions to extract more heat from the driver than the heat supplied by the warm regions to the driver.

After configuring the TTG 400 to the heat sink configuration, the configuration module 204 repeatedly analyzes the driver's biomarker values (that can be repeatedly updated by the monitoring module 202). If the configuration module 204 determines based on the analysis that the driver is vasoconstricted, the configuration module 204 configures the TTG 400 to a heat source configuration, an ambient configuration, or another configuration that is not a heat sink configuration. A factor that may be used in determining the configuration into which the configuration module 204 configures the TTG 400 when the driver is vasoconstricted is the cabin temperature. If the cabin temperature is high then the TTG 400 can enter the ambient configuration or may turn off/not control the hot/cold regions, for example, since the cabin temperature will naturally raise the driver's core temperature.

To achieve the heat source configuration, the configuration module 204 configures both the warm and cold regions to a determined temperature, e.g., 35 degrees Celsius or to a temperature above the ambient temperature (or above the driver's skin temperature). To achieve the ambient configuration, the configuration module 204 configures both the warm and cold regions to approximately the ambient temperature in the vehicle. These configurations beneficially reduce or stop the amount of heat absorbed by the TTG 400 from the driver's body and allow the driver's body to transition from a state of vasoconstriction to vasodilatation. Once the driver is vasodilated, or not vasoconstricted, the configuration module 204 may configure the TTG 400 to the heat sink configuration that draws heat from the driver and keeps the driver alert. The alert module 104 may ensure that a minimum period elapses between heat sink configurations. In one embodiment, to avoid a hysteresis loop and to avoid removing too much heat from the driver too quickly, the configuration module 204 configures the TTG 400 to the heat sink configuration after a determined amount of time has elapsed since determining that the driver is no longer vasoconstricted or since the last heat sink configuration.

Additionally, in one embodiment, the configuration module 204 does not allow the TTG 400 to remain in the heat sink configuration for a period longer than a determined period. The configuration module 204 therefore configures the TTG 400 to a heat source configuration, an ambient configuration, or another configuration if the TTG 400 has been in the heat sink configuration for a determined period. Such time limits on TTG 400 in heat sink configuration beneficially allow the configuration module 204 to safely extract heat from the driver and avoid excessive heat extraction.

Figure 3:
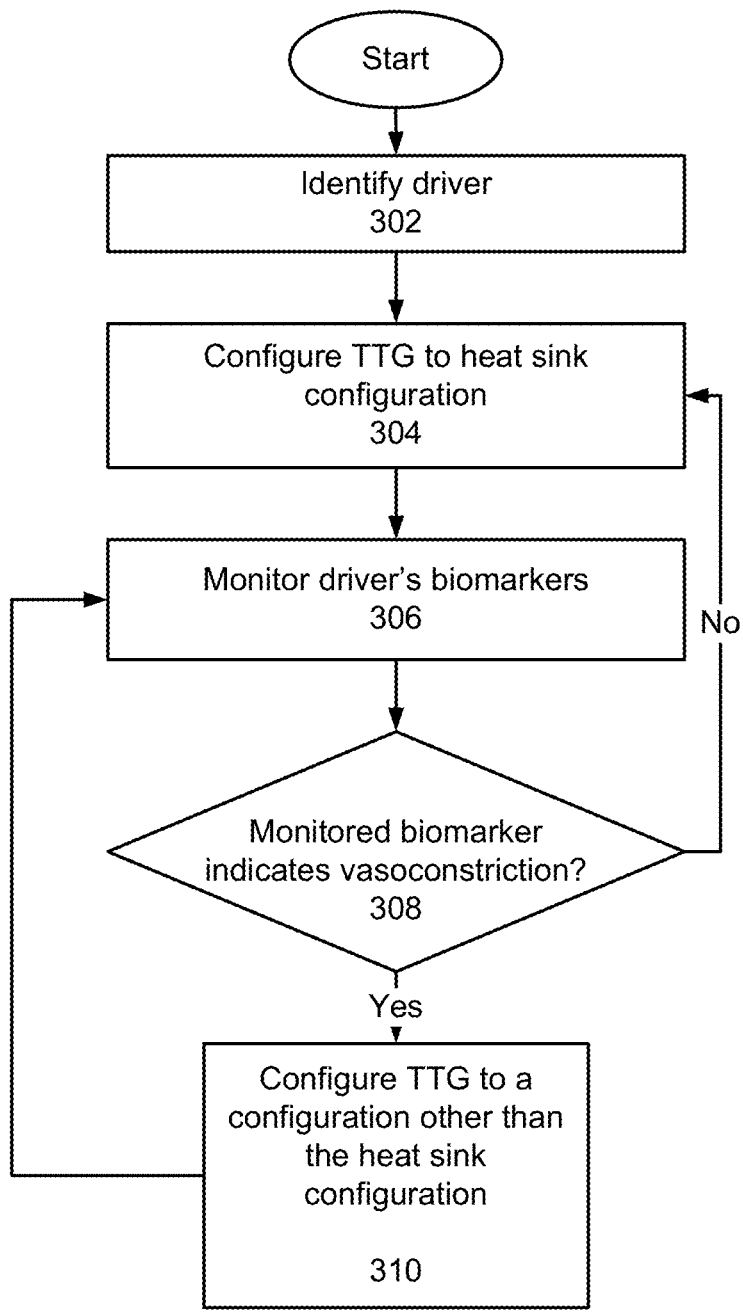
FIG. 3 is a flow diagram illustrating a method for keeping a driver alert without monitoring the driver's drowsiness according to one embodiment.

FIG. 3 is a flow diagram illustrating a method for keeping a driver alert. The alert module 102 determines 302 the driver's identity through a key fob on the driver, a pin entered by the driver, a biometric identification, or another means. After determining that the heat sink configuration is warranted based on any of the factors described herein, the alert module 102 configures 304 the TTG 400 to the heat sink configuration and repeatedly monitors 306 the driver's one or more biological markers. The alert module 102 analyzes 308 the monitored biomarkers and determines if the biomarkers indicate vasoconstriction. If yes, the alert module 102 configures 310 the TTG 400 to a configuration other than the heat sink configuration (e.g. heat source or ambient configuration). Otherwise, the alert module 102 configures (or maintains) 304 the TTG 400 to the heat sink configuration.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. One of ordinary skill in the art will understand that the hardware, implementing the described modules, includes at least one processor and a memory, the memory comprising instructions to execute the described functionality of the modules.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based herein. Accordingly, the disclosure of the embodiments is intended to be illustrative, but not limiting.

What is claimed is:

1. A method for controlling a thermal grill on a steering wheel of a vehicle, comprising:
    determining, by a processor, if a vasoconstriction threshold of a driver of the vehicle is exceeded based on biomarker information associated with the driver;
    in response to the vasoconstriction threshold not being exceeded, configuring the thermal grill into a heat sink configuration; and
    in response to the vasoconstriction threshold being exceeded, configuring the thermal grill into a configuration other than the heat sink configuration.

2. The method of claim 1, wherein the biomarker information comprises a core body temperature of the driver.

3. The method of claim 1, wherein the biomarker information comprises a skin temperature of the driver.

4. The method of claim 3, wherein the skin temperature of the driver comprises a temperature of a palm of a hand of the driver.

5. The method of claim 4, wherein the temperature of the palm of the driver is determined using a thermocouple located on the steering wheel.

6. The method of claim 1, wherein the biomarker information comprises a measure of blood flow of the driver.

7. The method of claim 6, wherein the measure of blood flow of the driver is determined using a laser Doppler mechanism in contact with a hand of the driver.

8. The method of claim 6, wherein the measure of blood flow of the driver is determined using a thermal camera configured to capture images of a glabrous skin area of the driver.

9. The method of claim 1, wherein the vasoconstriction threshold is selected based on one or more of: the weight of the driver, the age of the driver, vehicle cabin temperature, or one or more other characteristics of the driver.

10. The method of claim 1, wherein the vasoconstriction threshold is selected based on previously determined biomarker information associated with the driver.

11. The method of claim 1, wherein the vasoconstriction threshold is selected based on biomarker information associated with the general population.

12. The method of claim 1, further comprising:
   determining the identity of the driver;
   wherein the vasoconstriction threshold is selected based on the identity of the driver.

13. The method of claim 1, wherein determining if the vasoconstriction threshold of the driver is exceeded comprises:
   measuring the biomarker information associated with the driver over a period of time;
   determining average biomarker information associated with the driver based on the biomarker information measured over the period of time;
   measuring the biomarker information associated with the driver over a second period of time; and
   determining that the vasoconstriction threshold of the driver is exceeded in response to the biomarker information measured over the second period of time differing from the determined average biomarker information by more than a threshold measurement.

14. The method of claim 1, wherein determining if the vasoconstriction threshold of the driver is exceeded comprises:
   measuring the biomarker information associated with the driver over a period of time;
   determining that the vasoconstriction threshold of the driver is exceeded based on a determination that the biomarker information measured over the period of time changes by a rate greater than a threshold rate.

15. The method of claim 1, wherein determining if the vasoconstriction threshold of the driver is exceeded comprises:
   measuring the biomarker information associated with the driver over a period of time;
   determining that the vasoconstriction threshold of the driver is exceeded based on a determination that the biomarker information measured over the period of time changes by a rate less than the threshold rate.

16. A vehicle system for controlling a thermal grill on a steering wheel of the vehicle, comprising:
   a biometric monitor system configured to determine if a vasoconstriction threshold of a driver of the vehicle is exceeded based on biomarker information associated with the driver; and
   a thermal grill control unit configured to:
      in response to a determination that the vasoconstriction threshold is not exceeded, configure the thermal grill into a heat sink configuration; and
      in response to a determination that the vasoconstriction threshold is exceeded, configured the thermal grill into a configuration other than the heat sink configuration.

17. The system of claim 16, wherein the biomarker information comprises one or more of: a core body temperature of the driver, a skin temperature of the driver, and a measure of blood flow of the driver.

18. The system of claim 16, wherein the vasoconstriction threshold is selected based on one or more of: the weight of the driver, the age of the driver, vehicle cabin temperature, previously determined biomarker information associated with the driver, biomarker information associated with the general population, and the identity of the driver.

19. A non-transitory computer-readable storage medium storing computer-executable program instructions for controlling a thermal grill on a steering wheel of a vehicle, the instructions, when executed by a processor, configured to perform steps comprising:
   determining, by a processor, if a vasoconstriction threshold of a driver of the vehicle is exceeded based on biomarker information associated with the driver;
   in response to the vasoconstriction threshold not being exceeded, configuring the thermal grill into a heat sink configuration; and
   in response to the vasoconstriction threshold being exceeded, configuring the thermal grill into a configuration other than the heat sink configuration.

20. The computer-readable storage medium of claim 19, wherein the biomarker information comprises one or more of: a core body temperature of the driver, a skin temperature of the driver, and a measure of blood flow of the driver.

21. The computer-readable storage medium of claim 19, wherein the vasoconstriction threshold is selected based on one or more of: the weight of the driver, the age of the driver, vehicle cabin temperature, previously determined biomarker information associated with the driver, biomarker information associated with the general population, and the identity of the driver.

* * * * *